March 29, 1960 R. M. WOLFE 2,930,906

FERROELECTRIC COUNTING CIRCUIT

Filed Aug. 8, 1957

INVENTOR
R. M. WOLFE
BY [signature]
ATTORNEY

United States Patent Office 2,930,906
Patented Mar. 29, 1960

2,930,906

FERROELECTRIC COUNTING CIRCUIT

Robert M. Wolfe, Colonia, N.J., assignor to Bell Telephone Laboratories, Incorporated, New York, N.Y., a corporation of New York Application August 8, 1957, Serial No. 677,028

18 Claims. (Cl. 307—88.5)

Figures 1, 2:
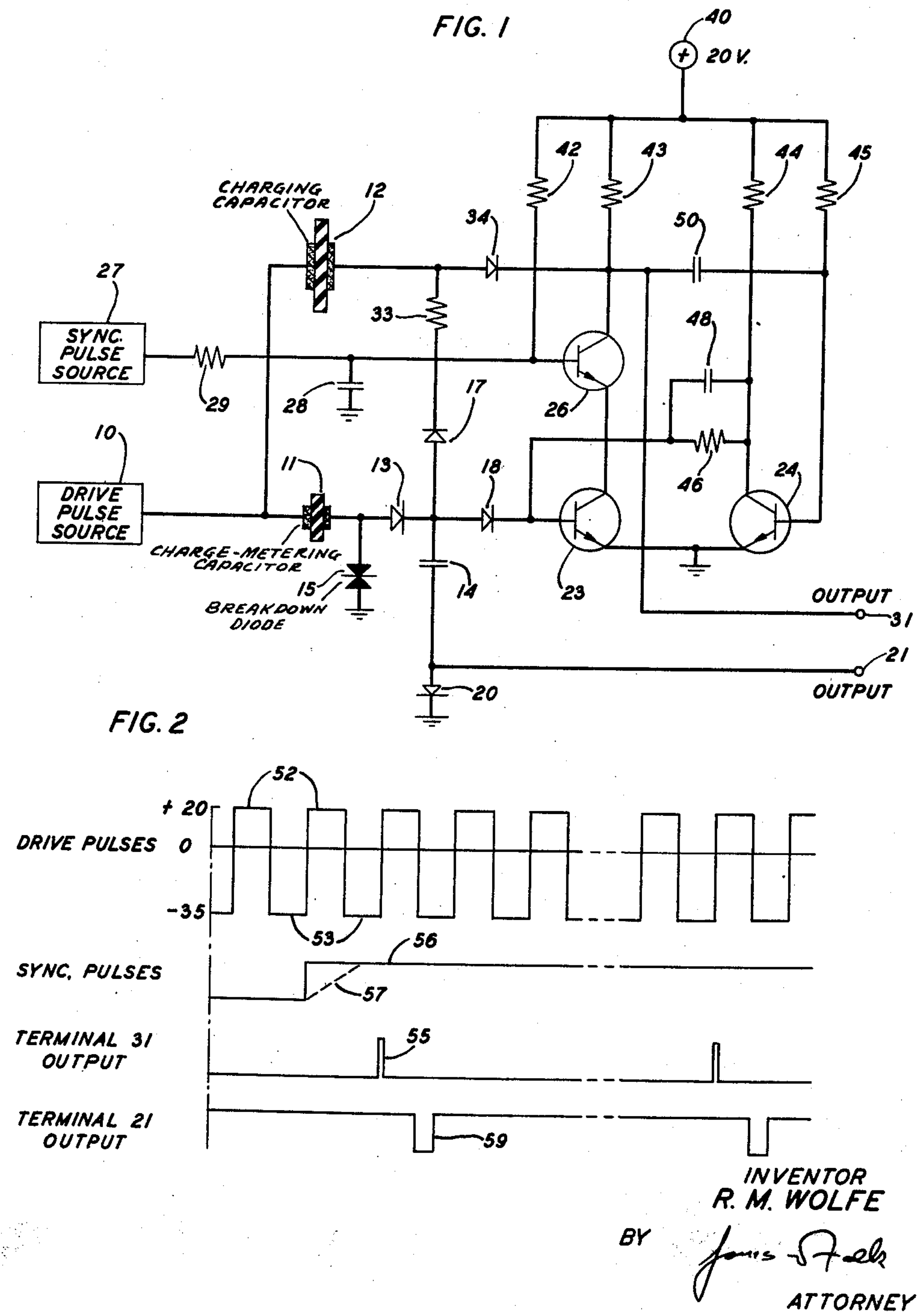

This invention relates to electrical circuits and more particularly to circuits for the counting of distinct pulses.

It is often necessary in electrical circuits to count a predetermined number of distinct pulses and to deliver, at some particular time, a pulse or signal indicative of the total pulses counted. One circuit for attaining this is described in my prior application Serial No. 552,459, filed December 12, 1955, now Patent 2,854,590 issued September 30, 1958, wherein the pulses to be counted are applied to an integrating capacitor through a ferroelectric charge-metering capacitor, a path being provided for resetting the ferroelectric charge-metering capacitor after each applied pulse. The number of pulses to be counted is determined by the size ratio of the charge-metering ferroelectric capacitor and the integrating capacitor. As disclosed in my prior application, the integrating capacitor is initially at reference or ground potential and is charged by the application of unit increments until the voltage on the capacitor exceeds some reference bias applied thereto by the associated circuit, at which time an output indication occurs.

Such circuitry has a number of advantages including being independent of variations in the length, magnitude, and duration of the applied pulses; the only requirement is that they be sufficient to switch the charge-metering ferroelectric capacitor. However, the circuit requires an accurate voltage bias to determine the total charge allowed to be placed on the integrating capacitor before an output pulse is delivered. Further, the circuit itself produces only a single output on counting of the applied pulses, whereas for many circuit applications more than one output is desired, thereby requiring additional logic and memory circuitry to be connected to the output of the counting circuit.

Accordingly, it is an object of this invention to provide an improved circuit for counting distinct pulses.

It is another object of this invention to provide a ferroelectric pulse counting circuit employing an integrating capacitor wherein the need for stringent control of a bias voltage is obviated.

It is still another object of this invention to provide an improved counting circuit which delivers output signals having a predetermined time relationship with the input signals. More specifically, it is an object of this invention to provide a counting circuit which delivers one output pulse coincident with an input driving pulse of one polarity and which delivers a second output pulse coincident with an input pulse of another polarity, both output signals occurring after a total count of input pulses has been reached.

Briefly, in accordance with my present invention a first and a second ferroelectric capacitor are connected in parallel to a source of driving or input pulses. The first ferroelectric capacitor is connected through a diode poled in one direction to an integrating capacitor and serves to deliver unit increments of charge to the integrating capacitor in response to input pulses in the manner disclosed in my above-mentioned prior application. The second ferroelectric capacitor is connected through another diode poled in the opposite direction to the integrating capacitor. The second ferroelectric capacitor is larger than the first, and the ratio of their sizes, in accordance with an aspect of my present invention, determines the number of pulses to be counted by the circuit before output pulses are delivered.

In accordance with another aspect of my present invention no voltage bias need be applied to the integrating capacitor to determine when the total count has been attained. Instead, the integrating capacitor has a charge applied to it by the second capacitor before any pulses are counted. The incremental unit charges from the first capacitor then remove the integrating capacitor charge and return the integrating capacitor to the reference or ground potential. When the integrating capacitor is returned to ground potential, output signals may be obtained. In this respect it should be noted that the number of input or drive pulses to be counted is accordingly determined by the ratio of the sizes of the two ferroelectric capacitors only and not by a carefully monitored or accurately controlled voltage. Further, the two ferroelectric capacitors have a common electrode electrically and are advantageously fabricated on a single crystal so that the ratio of their capacitances may be determined solely by the ratio of the areas of the separate and distinct electrodes individual to the two capacitors opposite their common electrode.

In the operation of this illustrative circuit embodiment of my invention positive and negative drive pulses are applied to the common electrode of the parallel connected ferroelectric capacitors from the driving or input pulse source. The first negative driving pulse causes the remanent polarization of the second ferroelectric capacitor to be reversed, thereby placing a predetermined negative charge on the integrating capacitor. Subsequent positive pulses are metered through the first ferroelectric capacitor until the integrating capacitor is completely discharged, at which time the next subsequent positive pulse passes through a circuit connected in parallel with the integrating capacitor. Thus, the total count of a counting circuit in accordance with my present invention is determined by the ratio of the electrode area of the second or charging ferroelectric capacitor to the electrode area of the first or charge-metering ferroelectric capacitor and is relatively independent of the integrating capacitor and of biases applied thereto, as ground is the threshold potential and is readily available, reliable, and not subject to variation, as are bias potentials.

In accordance with another aspect of my present invention, the second or charging ferroelectric capacitor and the associated circuitry are also employed to provide memory and logic functions to enable the circuit to deliver more than a single output pulse after recognition of the predetermined count. For example, in the data transmission subset or terminal circuitry for use with telephone lines, as disclosed in Patent 2,828,362, granted March 25, 1958, of G. P. Darwin, W. A. Malthaner, and J. E. Schewenker, a counting circuit in accordance with my present invention may be employed in lieu of a counting circuit as disclosed in my above-mention application. In such a data transmission subset it is desired that the counting circuit upon determination of a count of seven pulses emit first a character marking pulse and then subsequently a word pulse. This may be attained by a circuit in accordance with my prior application in which a flip-flop circuit is activated after recognition of the predetermined count to provide the two desired output signals.

In accordance with my present invention a gate circuit is connected to the second or charging ferroelectric capacitor and the memory function is provided by the second ferroelectric capacitor itself. A monostable multivibrator is also connected in parallel with the integrating capacitor. A first output pulse is generated by the multivibrator in response to the first positive drive pulse after discharge of the integrating capacitor. The second output pulse is then generated by the resetting of the second or charging ferroelectric capacitor in response to a negative drive pulse after the total count. Thus, the first and second output pulses are synchronized with the leading edges of the positive and negative drive pulses, respectively.

In one specific illustrative embodiment, described further in detail below, the occurrence of the second output pulse was delayed for one drive pulse cycle. This was attained by applying a synchronizing pulse through a one pulse delay circuit to the gating circuit connected to the second ferroelectric capacitor.

It is a feature of this invention that both a charge-metering and a charging ferroelectric capacitor be utilized in a counting circuit, the ratio of the electrode area of the charging capacitor to the electrode area of the charge-metering capacitor determining the total count of the circuit.

It is a further feature of this invention that the larger ferroelectric capacitor charges an integrating capacitor in accordance with the total count desired and the smaller ferroelectric capacitor meters discrete charges into the integrating capacitor until the integrating capacitor is fully discharged, the complete discharge of the integrating capacitor causing at least one output pulse to be delivered indicating the total count of the circuit.

It is a further feature of this invention that the charging ferroelectric capacitor be connected through a gating circuit to provide a second output signal a predetermined time interval after the first output signal. More specifically, it is a feature of this invention that a first output signal occur on application of a drive pulse of one polarity after the predetermined count and the second output signal from the charging ferroelectric capacitor occur on a subsequent occurrence of a drive pulse of the opposite polarity.

A complete understanding of this invention and of these and various other features thereof may be gained from consideration of the following detailed description and the accompanying drawing, in which:

Fig. 1 is a schematic representation of one illustrative embodiment of my invention; and Fig. 2 depicts time plots of various pulses which will be explained in connection with the illustrative embodiment of Fig. 1.

Referring now to Fig. 1, in the illustrative embodiment of my invention therein depicted a source 10 of drive or input pulses is connected to one electrode of a small charge-metering ferroelectric capacitor 11 and to one electrode of a larger charging ferroelectric capacitor 12. The charge-metering capacitor 11 is connected through a diode 13 to the integrating capacitor 14 to which it delivers unit increments of charge in response to applied pulses, as described broadly in my prior application and further below. A double anode breakdown or Zener diode 15 is connected between capacitor 11 and ground or reference potential to provide a resetting path for the capacitor 11.

The integrating capacitor 14 and diode 13 are also connected to a diode 17 and a diode 18, while the other side of the integrating capacitor is connected through a diode 20 to ground and is also connected to one output terminal 21. Diode 20 allows passage of positive pulses from capacitor 11 to ground while causing the negative resulting pulse from capacitor 12 to appear at the output terminal 21. Diode 18 is connected to apply a positive pulse from source 10 through ferroelectric capacitor 11 and diode 13 to a transistor flip-flop circuit comprising transistors 23 and 24 after discharge of the integrating capacitor 14, when a predetermined number of pulses have been counted. Diode 18 blocks the passage of positive pulses to transistor 23 from source 10 while a negative potential or charge exists on capacitor 14.

A transistor 26 which acts as a gate circuit is connected between transistor 23 and the ferroelectric capacitor 12 and is actuated by a pulse from a synchronizing pulse source 27 applied through a delay circuit, including capacitor 28 and resistor 29, to its base, to permit the passage of an output pulse from the flip-flop circuit to another output terminal 31. It should be noted, however, that while a flip-flop circuit is depicted in this specific illustrative embodiment of my invention, such is not needed and could be replaced by a gate circuit.

The larger ferroelectric capacitor 12 receives pulses from the drive or input pulse source 10 and has its other electrode connected through a resistor 33 and diode 17, to integrating capacitor 14, and through a diode 34 to the collector of gate transistor 26. Diode 17 pervents setting of capacitor 12 through the path in which it is located. A source 40 of positive potential is connected through appropriate resistors 42, 43, 44, and 45 to apply potentials to transistors 23, 24, and 26. Source 40 also backbiases diode 34 to prevent setting of ferroelectric capacitor 12 when transistor 26 is not enabled. A portion of the feedback path for the transistor flip-flop circuit is defined by a resistor 46 and a capacitor 48 while another portion of this feedback path is defined by capacitor 50.

The operation of the circuit of Fig. 1 will now be explained in conjunction with the pulses shown in a time plot in Fig. 2. Drive pulse source 10 supplies a train of positive and negative pulses 52 and 53, respectively. The first positive pulse 52 from source 10 passes through capacitor 11, diode 13, and diode 18 and triggers transistor 23 of the multivibrator which, in turn, delivers a pulse through transistor 26 to apply a forward bias to diode 34. The removal of the backbias of diode 34 permits the positive drive pulse to switch ferroelectric capacitor 12 through diode 34. The next negative drive pulse 53 resets ferroelectric capacitor 12, causing capacitor 14 to be negatively charged in accordance with the amount of charge metered through capacitor 12. Subsequent positive pulses apply metered unit charges through capacitor 11 and diode 13 to capacitor 14 until capacitor 14 is returned to zero charge, at which time the metered positive drive pulse passes through diode 18 to trigger transistor 23. Thus, it is apparent that the count ratio is determined by the relative electrode areas of capacitors 11 and 12 so long as capacitor 14 is sufficiently large to hold the negative charge metered through capacitor 12.

A first output pulse, which in the data subset of the above-mentioned Darwin et al. patent may be a character mark pulse 55, is generated by the multivibrator in response to the first positive drive pulse 52 after the application of a synchronizing pulse 56 to the base of gating transistor 26, which synchronizing pulse 56 in this specific embodiment may be delayed one positive drive pulse by capacitor 28 and resistor 29, as indicated by the dotted line 57 in Fig. 2. This output pulse 55 passes through transistor 26 to terminal 31.

A second output pulse 59, which in the data transmission subset of the above-mentioned Darwin et al. patent may be a word pulse, is generated by the resetting of ferroelectric capacitor 12 in response to a negative drive pulse 53. Thus, the two output pulses 55 and 59 are synchronized with the leading edges of the positive and negative drive pulses 52 and 53, respectively.

The synchronizing pulse or signal 56 serves to assure that the timing of the counting circuit is in synchronism with other circuitry of the system in which the counting circuit is employed. It may be noted that in the specific embodiment of my invention output pulses are generated before the initial count and then after the count of each predetermined number of pulses for so long as the syncronizing signal 56 is applied to enable gating transistor 26. When transistor 26 is not enabled, no outputs occur. Accordingly, an output pulse 55 only occurs when three logical conditions are satisfied, namely that capacitor 14 is completely discharged, a drive pulse 52 is applied through diode 18 to cause transistor 23 to conduct, and a synchronizing signal is present at transistor 26. Thus it is clear that the portion of the circuit comprising transistors 23, 24, and 26 functions as a logic circuit to develop a pulse at output terminal 31 only when these three logical conditions are satisfied. Similarly, an output only occurs at terminal 21 when ferroelectric capacitor 12 is being reset, which requires transistor 26 to have been conducting to enable the ferroelectric capacitor to have been set, that capacitor 14 be discharged, and that a negative drive pulse 53 be applied to the ferroelectric capacitor. It is therefore apparent that a counting circuit in accordance with my present invention incorporates both logical and memory functions into the operation of the charging or larger ferroelectric capacitor 12.

It is to be understood that the above-described arrangements are merely illustrative of the application of the principles of my invention. Numerous other arrangements may be devised by those skilled in the art without departing from the spirit and scope of the invention.

What is claimed is:

1. A ferroelectric counting circuit comprising an integrating capacitor, a charge-metering ferroelectric capacitor, a second ferroelectric capacitor having a larger electrode area than said charge-metering ferroelectric capacitor and having one electrode in common with said charge-metering ferroelectric capacitor, a source of positive and negative pulses connected to both of said ferroelectric capacitors, means connecting one side of said integrating capacitor to said ferroelectric capacitors, a first output terminal connected to the opposite side of said integrating capacitor, means including said pulse source for switching the state of said second ferroelectric capacitor to apply a charge of one polarity to said integrating capacitor prior to the initiation of counting by said circuit, and means including said pulse source for repetitively switching the state of said charge-metering ferroelectric capacitor to remove said charge from said integrating capacitor in discrete steps.

2. A ferroelectric counting circuit in accordance with claim 1 wherein said means for switching the state of said second ferroelectric capacitor includes means for applying a pulse of one polarity from said source to said second capacitor and said means for switching the state of said charge-metering capacitor includes means for applying a pulse of the opposite polarity from said source to said charge-metering capacitor.

3. A ferroelectric counting circuit in accordance with claim 2 further comprising a logic circuit, a second output terminal connected to said logic circuit, and means for applying pulses from said source through said charge-metering ferroelectric capacitor to said logic circuit only when said integrating capacitor is discharged.

4. A ferroelectric circuit in accordance with claim 2 further comprising means for applying an output pulse to said first output terminal only on switching of said second ferroelectric capacitor to charge said integrating capacitor.

5. A ferroelectric counting circuit comprising a pulse source, a first and a second ferroelectric capacitor each having an electrode connected to said pulse source and having different electrode areas, an integrating capacitor having one electrode connected to one of said ferroelectric capacitors through a diode poled in one direction and to the other of said capacitors through a diode poled in the other direction, a first output terminal connected to the opposite electrode of said integrating capacitor, and resetting means including said pulse source connected to said ferroelectric capacitors, the total count being determined by the ratio of electrode area of said first ferroelectric capacitor to the electrode area of said second ferroelectric capacitor.

6. A ferroelectric counting circuit in accordance with claim 5 wherein said means for resetting said ferroelectric capacitors comprises a first and a second transistor arranged in a multivibrator circuit, a second output terminal, a gating transistor connected intermediate said multivibrator and said second output terminal, and pulse means for applying a gating pulse to said gating transistor.

7. A ferroelectric counting circuit comprising an integrating capacitor, a source of positive and negative input pulses, a point of reference potential, a first ferroelectric capacitor connected to said source and said integrating capacitor, a second ferroelectric capacitor connected to said source and said integrating capacitor, said second ferroelectric capacitor having a larger electrode area than said first ferroelectric capacitor and the count of said circuit being determined by the ratio of said electrode areas, a diode connecting said point of reference potential to the side of said integrating capacitor remote from the ferroelectric capacitor connections, means for switching said second ferroelectric capacitor to apply a charge to said integrating capacitor in response to a pulse of one polarity from said pulse source, means for repetitively switching said first ferroelectric capacitor in response to pulses of the opposite polarity from said pulse source to remove said charge from said integrating capacitor in discrete steps, a first output terminal, means for applying a pulse to said first output terminal from said pulse source when said integrating capacitor is discharged, a second output terminal connected to the common connection of said integrating capacitor and said diode, and means for applying a pulse to said second output terminal on switching of said second ferroelectric capacitor to charge said integrating capacitor.

8. A ferroelectric counting circuit comprising an integrating capacitor, a source of positive and negative input pulses, a first ferroelectric capacitor connected to said source and said integrating capacitor, a second ferroelectric capacitor connected to said source and said integrating capacitor, said second ferroelectric capacitor having a larger electrode area than said first ferroelectric capacitor and the count of said circuit being determined by the ratio of said electrode areas, means for switching said second ferroelectric capacitor to apply a charge to said integrating capacitor in response to a pulse of one polarity from said pulse source, means for repetitively switching said first ferroelectric capacitor in response to pulses of the opposite polarity from said pulse source to remove said charge from said integrating capacitor in discrete steps, a first output terminal, means for applying a pulse to said first output terminal from said pulse source when said integrating capacitor is discharged, a second output terminal, means for applying a pulse to said second output terminal on switching of said second ferroelectric capacitor to charge said integrating capacitor, gating means between said first output terminal and said pulse applying means, a second pulse source connected to said gating means, means for producing said pulses at said output terminals in synchronism with said input pulses, and means for preventing pulses from appearing at said output terminals when said gating means is not enabled by said second pulse source.

9. A ferroelectric counting circuit comprising an integrating capacitor, a source of positive and negative input pulses, a first ferroelectric capacitor connected to said source and said integrating capacitor, a second ferroelectric capacitor connected to said source and said integrating capacitor, said second ferroelectric capacitor having a larger electrode area than said first ferroelectric capacitor and the count of said circuit being determined by the ratio of said electrode areas, means for switching said second ferroelectric capacitor to apply a charge to said integrating capacitor in response to a pulse of one polarity from said pulse source, means for repetitively switching said first ferroelectric capacitor in response to pulses of the opposite polarity from said pulse source to remove said charge from said integrating capacitor in discrete steps, a first output terminal, means for applying a pulse to said first output terminal from said pulse source when said integrating capacitor is discharged, gating means between said first output terminal and said pulse applying means, a second pulse source connected to said gating means, a second output terminal, means for applying a pulse to said second output terminal on switching of said second ferroelectric capacitor to charge said integrating capacitor, and means for preventing pulses appearing at said output terminals when said gating means is not enabled by said second pulse source, said last-mentioned means including means for preventing setting of said second ferroelectric capacitor on application thereto of pulses of said opposite polarity from said first-mentioned pulse source.

10. A ferroelectric counting circuit comprising an integrating capacitor, a first ferroelectric capacitor, a second ferroelectric capacitor having an electrode in common with said first ferroelectric capacitor, a source of positive and negative pulses connected to said ferroelectric capacitors, an output terminal connected to one electrode of said integrating capacitor means connecting said second ferroelectric capacitor to the opposite electrode of said integrating capacitor for switching of said second ferroelectric capacitor to charge said integrating capacitor when there is no charge on said integrating capacitor and to apply a pulse to said output terminal, and means connecting said first ferroelectric capacitor to said opposite electrode of said integrating capacitor for switching said first ferroelectric capacitor to remove increments of charge from said integrating capacitor when there is charge on said integrating capacitor.

11. A ferroelectric counting circuit in accordance with claim 10 wherein said second ferroelectric capacitor is of larger electrode area than said first ferroelectric capacitor.

12. A ferroelectric counting circuit in accordance with claim 11 further comprising means for resetting said first and said second ferroelectric capacitors.

13. A ferroelectric counting circuit comprising a pulse source, a charging and a charge-metering ferroelectric capacitor each having an electrode connected to said pulse source, said charging ferroelectric capacitor having an electrode area which is a multiple of the electrode area of said charge-metering ferroelectric capacitor, an integrating capacitor, a first rectifying diode having its anode connected to one side of said integrating capacitor and its cathode connected to said charging ferroelectric capacitor, a second rectifying diode having its cathode connected to said one side of said integrating capacitor and its anode connected to said charge-metering ferroelectric capacitor, a first output terminal connected to the opposite side of said integrating capacitor, means for applying a pulse to said output terminal by switching said charging ferroelectric capacitor to charge said integrating capacitor, and resetting means including said pulse source connected to said ferroelectric capacitors, the total count being determined by the ratio of the electrode area of said charging ferroelectric capacitor to the electrode area of said charge-metering ferroelectric capacitor.

14. A ferroelectric counting circuit in accordance with claim 13 wherein said means for resetting said ferroelectric capacitors comprises a first and a second transistor arranged in a multivibrator circuit, a second output terminal, a gating transistor connected intermediate said multivibrator and said second output terminal, and pulse means for applying a gating pulse to said gating transistor.

15. A ferroelectric counting circuit comprising first and second ferroelectric capacitors, a pulse source connected to said ferroelectric capacitors, an integrating capacitor, a first rectifying diode connecting said integrating capacitor to said second ferroelectric capacitor and having its anode adjacent said integrating capacitor, a second rectifying diode connecting said integrating capacitor to said first ferroelectric capacitor and having its cathode adjacent said integrating capacitor, pulse generating means connected to said integrating capacitor, a first output terminal connected to said pulse generating means, a second output terminal connected to said integrating capacitor opposite said ferroelectric capacitors, means for charging said integrating capacitor to a predetermined level by switching the remanent polarization of said second ferroelectric capacitor in response to a pulse of one polarity from said pulse source, and means for discharging said integrating capacitor in discrete steps by repetitively switching said first ferroelectric capacitor in response to pulses of opposite polarity from said pulse source.

16. A ferroelectric counting circuit in accordance with claim 15 wherein said second ferroelectric capacitor has a larger electrode area than said first ferroelectric capacitor and the total count of said circuit is determined by the ratio of said electrode areas.

17. A ferroelectric counting circuit in accordance with claim 15 further comprising means including said pulse generating means for producing a pulse at said first output terminal upon the completion of the discharge of said integrating capacitor and means for producing a pulse at said second output terminal only upon the charging of said integrating capacitor, said output pulses signifying the completion of one count cycle and the initiation of a succeeding count cycle, respectively.

18. A ferroelectric counting circuit in accordance with claim 17 further including means for synchronizing said output pulses with corresponding pulses from said pulse source.

References Cited in the file of this patent

UNITED STATES PATENTS

| | | |
|---|---|---|
| 2,695,396 | Anderson | Nov. 23, 1954 |
| 2,717,372 | Anderson | Sept. 6, 1955 |
| 2,854,590 | Wolfe | Sept. 30, 1958 |